UNITED STATES PATENT OFFICE.

JENS ANDREAS LARSEN, OF COPENHAGEN, DENMARK.

APPARATUS FOR MEASURING AND BOTTLING LIQUIDS.

1,031,187.

Specification of Letters Patent.

Patented July 2, 1912.

Application filed July 19, 1911. Serial No. 639,310.

*To all whom it may concern:*

Be it known that I, JENS ANDREAS LARSEN, machine manufacturer, subject of the King of Denmark, residing at Copenhagen, Denmark, have invented a new and useful Apparatus for Measuring and Bottling Liquids; and I do hereby declare the following to be a full, clear, and exact description of the same.

The present invention relates to improvements in liquid-measuring and filling devices, and has for its object to provide a simple and effective device of this character, one in which valves, springs, levers, and the like, ordinarily used in such apparatus, are eliminated.

Further objects of the invention are to provide a device which will measure exactly, which is readily cleaned, and which prevents the liquid from foaming, said liquid constantly flowing over the surfaces of the apparatus along which it passes.

The invention will be better understood by referring to the accompanying drawings, in which—

Figure 1:
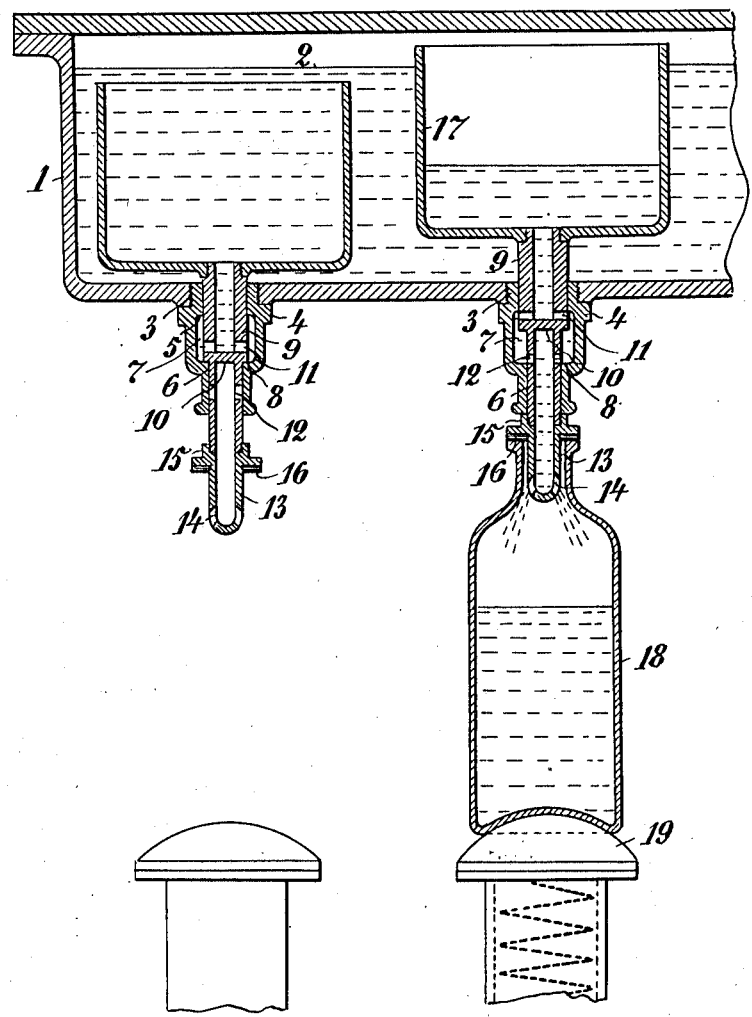
Figure 2:
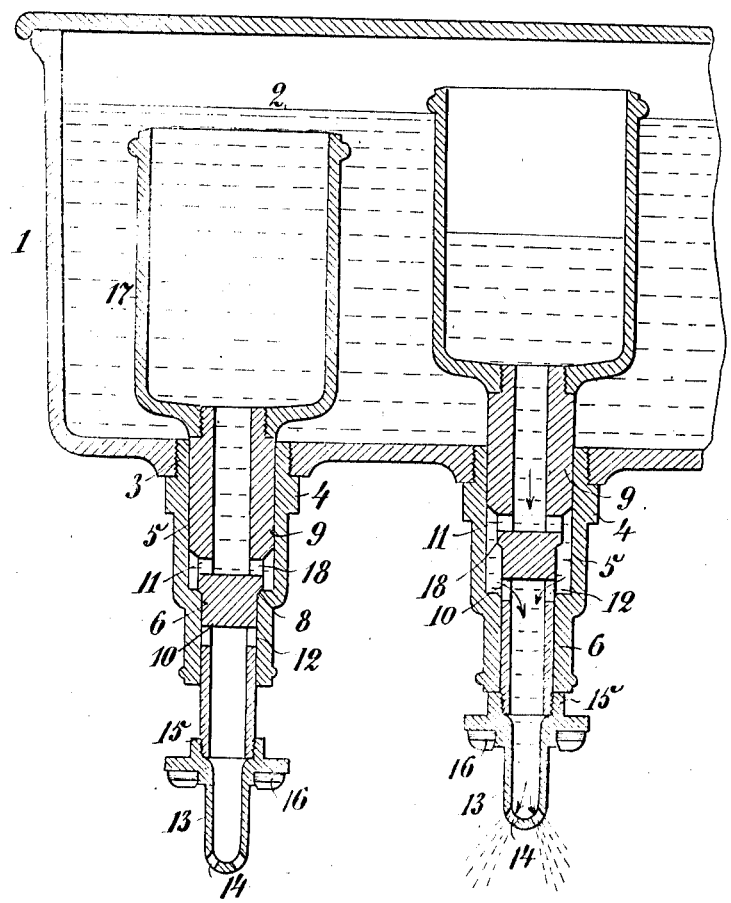

Figure 1 is a sectional view of one embodiment of the inventive idea; and Fig. 2 is a similar view of another embodiment of the inventive idea.

Referring to the drawings, 1 is a tank or receptacle which contains the liquid to be measured and bottled, any suitable means, such as a float (not shown), being provided to maintain the surface of the liquid at a constant level 2. In the bottom of this tank, there are provided screw-threaded openings 3, one for each of the measuring devices which are contained in the tank or receptacle. As all of these devices are identical in construction, a description of one will suffice.

Engaging in each opening 3 is a screw-threaded sleeve or boxing 4, the interior of which is provided with a relatively enlarged passage 5, and a relatively restricted passage 6, said passages being connected by an annular clearance space or cavity 7 of greater diameter than said passage 5. An abutment or seat 8 constitutes the lower boundary of said cavity. Through said sleeve or boxing 4 there extends a perforated or hollow stem or extension 9, the outer diameter of its upper part being equal to that of the passage 5, and the outer diameter of its lower part being equal to that of the passage 6. A measuring container or device 17 is secured in any suitable manner to the upper end of said extension 9. The perforation through said stem 9 is interrupted by an imperforate bottom 10, directly above which bottom are located one or more openings 11, and at a suitable distance below this bottom, there are provided in the walls of said stem or extension a plurality of similar openings 12. To the lower end of this stem or extension there is secured, in any suitable manner, a mouth-piece 13, provided with discharge orifices 14, and a collar 15 to the under side of which a rubber ring 16 is secured. Under normal conditions, when no liquid is passing through the receptacles or measuring devices, the top edge of each of said devices is below the surface 2 of the liquid contained in the tank. The distance between the apertures 11 and 12 is greater than the distance between the upper edge of each measuring device and the level 2 of the liquid. The parts are normally held by their own weight in such a position that no liquid will pass through the measuring device. In this condition of things, the apertures 11 communicate with the clearance space or cavity 7, whereas the apertures 12, which are arranged beneath the bottom 10, which latter is in engagement with the abutment 8, are obturated by the walls of the restricted passage 6.

When the bottling is to take place, a bottle 18' is placed on the bottle table 19, which latter is raised in the usual manner. The mouth-piece 30 enters the bottle neck, the mouth of the bottle engaging the ring 16. The stem or extension, and with it the measuring device, is now lifted until the ring 15 of the mouth-piece 13 strikes against the lower edge of the sleeve or boxing 4. The openings 12 will then communicate with the clearance space or cavity 7, and inasmuch as the openings 11 are continually in communication with said cavity, the liquid to be bottled will pass from the measuring device into the upper part of the perforation in said stem or extension 9, through apertures 11, cavity 7, apertures 12, the lower part of the perforation in said stem or extension 9, and out through the discharge orifices 14 into the bottle or other container 18. When the parts have been raised to such position that apertures 12 communicate with the cavity 7, the upper edge of the measuring device or container 17 has been lifted above the level 2, whereby the exact measuring of the liquid is effected. Such a construction enables the liquid to flow down along the interior surfaces of the stem or extension 9 and the mouth-piece 13, whereby foaming of the liquid is avoided. The liquid flows through the discharge orifices 14 into the bottle until the measuring device or container, the perforations in the stem or extension 9 and the cavity 7 are emptied, after which the bottle, and with it the measuring device 17 and the stem or extension 9, are lowered. The liquid is thus bottled in such a manner that no after-flow takes place. When the measuring device or container is lowered, so that its upper edge is beneath level 2 of the liquid—whereby the same is refilled—apertures 12 are obturated by the walls of the sleeve or boxing 4, to the end that no liquid may flow farther down than the cavity 7.

The modification illustrated in Fig. 2 differs from the expression of the inventive idea shown in Fig. 1, only with respect to clearance space or cavity 7 provided in the sleeve or boxing 4. Instead of this cavity so provided, the stem or extension 9 is provided with three different exterior diameters, having at its top, as before, the same diameter as that of the passage 5, and at its lower end the same diameter as that of the passage 6; but between these two diameters, there is provided a part 18 of a diameter less than that of the part which engages the passage 5 and greater than that of the part of said stem or extension which engages the passage 6, so that the clearance space or cavity that corresponds to the cavity 7 of Fig. 1 is due to the particular shape of the stem or extension rather than of the boxing 4, as in Fig. 1.

What is claimed is:—

1. In combination, a tank, a measuring device contained therein, a boxing associated with said tank and provided with a clearance space, a hollow extension associated with said device passing into said boxing and provided with two apertures one normally obturated by said boxing and the other normally registering with said clearance space, said extension being movable relatively to said tank to register both apertures with said clearance space.

2. In combination, a tank, a measuring device contained therein, a boxing associated with said tank and provided with a clearance space, a hollow extension associated with said device passing into said boxing and provided with two apertures one normally obturated by said boxing and the other normally registering with said clearance space, the distance between said apertures being greater than that between the top of the measuring device and the surface of the liquid in the tank, said extension being movable relatively to said tank to register both apertures with said clearance space.

3. In combination, a tank, a measuring device contained therein, a boxing associated with said tank and provided with a clearance space, a hollow extension associated with said device passing into said boxing and provided with two apertures one normally obturated by said boxing and the other normally registering with said clearance space, said extension being movable relatively to said tank to register both apertures with said clearance space.

4. In combination, a tank, a boxing associated with said tank and provided with an abutment, a measuring device contained in said tank passing through the bottom thereof and provided with a shoulder that normally engages said abutment, said device being also provided with two apertures one of which is above said shoulder and the other normally below said abutment, said device being movable to bring both of said apertures on the same side of said abutment.

5. In combination, a tank, a boxing associated therewith and provided with an enlarged passage and a restricted passage, a measuring device contained in said tank, a hollow extension connected to said measuring device passing through said boxing and provided with two apertures one being normally obturated by the walls of the restricted passage, said extension being movable relatively to said tank to register both of said apertures with said enlarged passage.

6. In combination, a tank, a boxing associated therewith and provided with an enlarged passage and a restricted passage, a measuring device contained in said tank, a hollow extension connected to said measuring device passing through said boxing and provided with a discharge orifice at its lower end and having two apertures one continually communicating with said enlarged passage and the other being normally obturated by the walls of said restricted passage, said extension being movable relatively to said tank to register both of said apertures with said enlarged passage.

In testimony whereof I have affixed my signature in presence of two witnesses.

JENS ANDREAS LARSEN.

Witnesses:
  VIGGO BLOM,
  R. STUB.